(12) United States Patent
Schilling

(10) Patent No.: US 6,705,820 B2
(45) Date of Patent: Mar. 16, 2004

(54) CARRIER/LIFT FOR A TRUCK BED

(75) Inventor: Harold M. Schilling, Mosinee, WI (US)

(73) Assignee: HMS Lift, LLC, Mosinee, WI (US)

( * ) Notice: Subject to any disclaimer, the term of this patent is extended or adjusted under 35 U.S.C. 154(b) by 2 days.

(21) Appl. No.: 09/844,239

(22) Filed: Apr. 25, 2001

(65) Prior Publication Data

US 2002/0031422 A1 Mar. 14, 2002

Related U.S. Application Data

(60) Provisional application No. 60/199,735, filed on Apr. 25, 2000.

(51) Int. Cl.[7] .................................................. B60P 1/44
(52) U.S. Cl. ........................ 414/462; 414/477; 414/537
(58) Field of Search ............................... 414/477, 478, 414/479, 480, 537, 538, 462

(56) References Cited

U.S. PATENT DOCUMENTS

| | | |
|---|---|---|
| 3,613,920 A | 10/1971 | Flamm |
| 3,687,314 A | 8/1972 | Haugland |
| 3,704,794 A | 12/1972 | Flamm |
| 3,720,335 A | 3/1973 | Ward |
| 3,726,423 A * | 4/1973 | Miron |
| 4,274,788 A * | 6/1981 | Sutton ......................... 414/462 |
| 5,380,141 A * | 1/1995 | Flowers ....................... 414/462 |
| 5,393,191 A | 2/1995 | Alexander |
| 5,603,600 A | 2/1997 | Egan et al. |
| 5,800,115 A | 9/1998 | Fenton |
| 5,807,058 A * | 9/1998 | Masse ......................... 414/477 |
| 5,829,945 A * | 11/1998 | Stanley ....................... 414/477 |
| 5,879,123 A | 3/1999 | Blaikie |
| 5,934,863 A * | 8/1999 | Beck .......................... 414/438 |
| 6,099,232 A * | 8/2000 | Dixon et al. ................. 414/494 |
| 6,176,672 B1 * | 1/2001 | Egan et al. .................. 414/462 |

* cited by examiner

*Primary Examiner*—James W. Keenan
(74) *Attorney, Agent, or Firm*—Wood, Phillips, Katz, Clark & Mortimer

(57) ABSTRACT

The problems of how to safely load and unload a small vehicle into a truck bed, and how to transport any ramps, etc., used to load the vehicle, and/or any other cargo in the truck bed occupied by the vehicle, are addressed by providing a carrier/lift adapted to be mounted in a truck bed, and having a carrying platform that pivots and translate in a constrained manner along a pair of tracks to an inclined loading position for safe and convenient loading of the vehicle into the bed of a truck. A platform having a recess for storage of a pair of nestable loading ramps is disclosed. The platform can be supported above the floor of a truck bed to provide usable storage space in the bed of the truck between the platform, with the nested ramps stowed therein, and the floor of the truck bed.

19 Claims, 7 Drawing Sheets

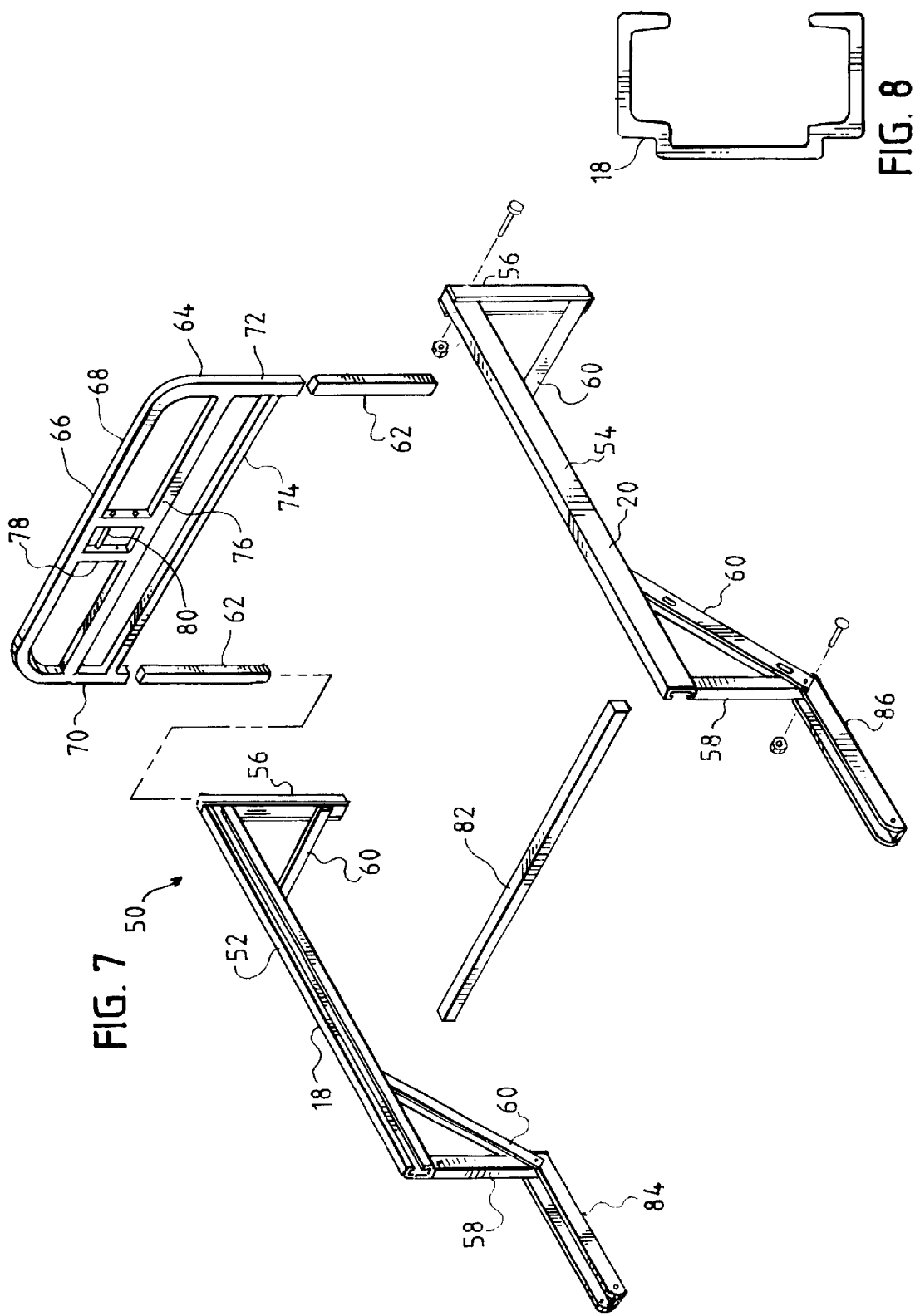

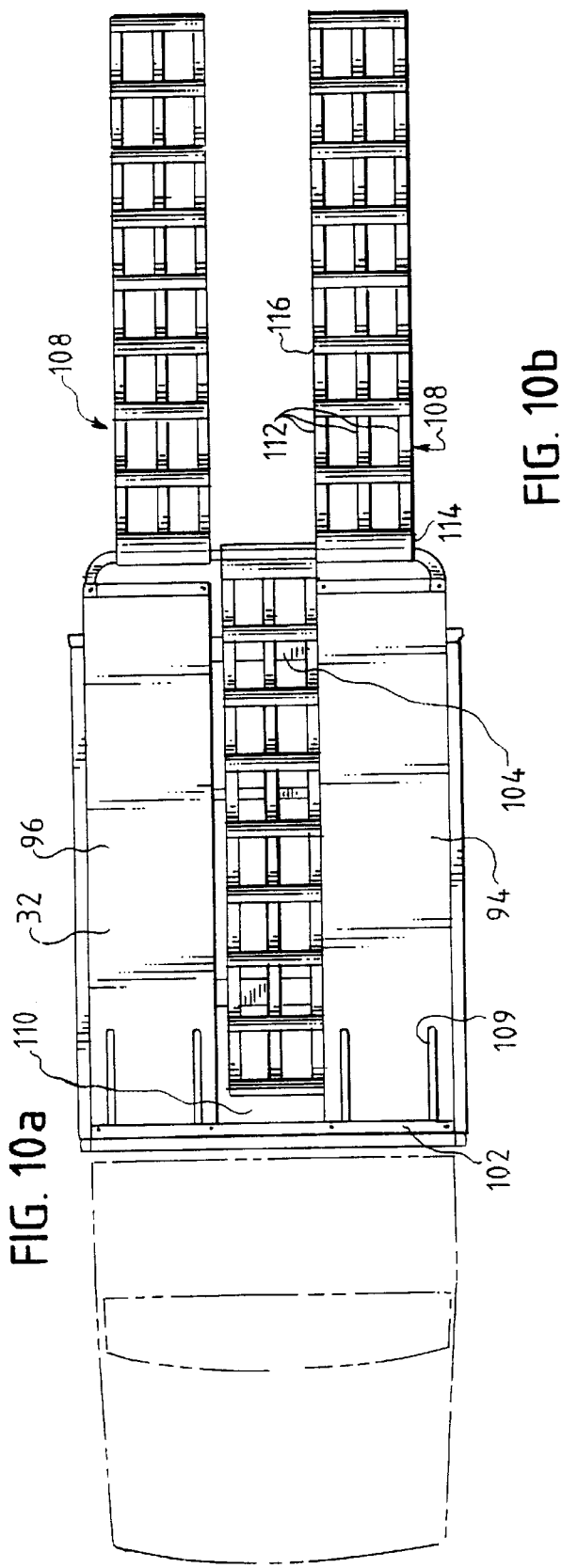

CARRIER/LIFT FOR A TRUCK BED

This application claims the benefit of U.S. Provisional Application No. 60/199,735, filed Apr. 25, 2000.

FIELD OF THE INVENTION

This invention relates to an apparatus for loading and carrying a small vehicle in a truck bed, and more particularly to such an apparatus providing usable storage space in the truck bed while carrying the vehicle.

BACKGROUND OF THE INVENTION

Persons wishing to transport a small vehicle, such as a snowmobile, a motorcycle, an All Terrain Vehicle (ATV), or a lawn tractor in the bed of a truck are faced with two problems: how to safely load and unload the vehicle into the truck bed; and how to transport any ramps, etc., used to load the vehicle, and/or any other cargo with the truck bed occupied by the vehicle.

SUMMARY OF THE INVENTION

My invention addresses the first of these problems by providing a carrier/lift adapted to be mounted in a truck bed, and having a vehicle carrying platform that pivots and translates in a constrained manner along a pair of tracks to an inclined loading position for safe and convenient loading of the vehicle into the bed of a truck. My invention addresses the second problem defined above by utilizing a platform having a recess for stowage of a pair of nestable loading ramps. The platform can be supported above the floor of the truck bed to provide usable storage space in the bed of the truck between the platform, with the ramps stowed therein, and the floor of the bed.

In one form of my invention, a carrier/lift for loading and carrying a small vehicle in the bed of a truck includes a pair of longitudinal tracks adapted for mounting one track adjacent each side of the bed of a truck. A transverse beam is adapted at the ends thereof to engage the longitudinal tracks for translating movement of the transverse beam along the tracks. A platform is mounted on the transverse beam for pivoting movement between a carrying position, in which the platform extends generally parallel to the longitudinal tracks, and a loading position in which the platform is inclined with respect to the longitudinal tracks. The pivoting movement of the platform on the transverse beam, in combination with the translating movement of the transverse beam along the longitudinal tracks, provide a pivoting and translating motion of the platform that facilitates loading and carrying the small vehicle in the bed of a truck.

In some forms of my invention, the carrier/lift also includes a frame adapted for supporting the longitudinal tracks above the bed of a truck.

In another form of my invention, the transverse beam of the carrier/lift includes a roller at each end thereof adapted to engage one of the pair of longitudinal tracks, and each of the tracks is adapted to receive the roller and constrain the roller for translating rolling movement of the roller along the track. The transverse beam may include two rollers at each end thereof for engaging one of the pair of longitudinal tracks, one of the two rollers at each end being mounted to the transverse beam forward of the first pivot axis and the other roller being mounted to the transverse beam aft of the first pivot axis.

The frame of the carrier/lift may include left and right rail assemblies, each including one of the pair of longitudinal tracks and a front and rear leg extending downward from the longitudinal track, the legs being adapted to support the longitudinal track above the floor of the bed of a truck. A front support assembly is adapted for joining the left and right rail assemblies at a forward end thereof, and a rear spacer bar is adapted for joining the left and right rail assemblies at a aft end thereof. The tracks may have a generally C-shaped cross section configured to receive and constrain the rollers on the end of the transverse beam. The tracks may open at an aft end thereof for receipt of the rollers, and the rear spacer bar may be adapted for attachment to the left and right rail assemblies after installation of the rollers into the tracks, and at a position along the left and right rails for limiting aftward translation of the transverse beam.

The carrier/lift may include a left and right swing arm for guiding movement of the platform between the loading and carrying positions, and for partially supporting the platform while guiding the movement thereof. The left swing arm may be pivotally attached at one end thereof to the left rear leg of the frame at a lower end of the left rear leg, and pivotally attached at the other end thereof to the platform at a point aft of the first pivot axis. The right swing arm may be pivotally attached at one end thereof to the right rear leg of the frame at a lower end of the right rear leg, and pivotally attached at the other end thereof to the platform at a point aft of the first pivot axis.

The transverse beam may include a right and left transverse beam pivot point defining a first pivot axis. The platform may include a right and left platform pivot point defining a second pivot axis. The carrier lift may include a pair of links for attaching the platform to the transverse beam, one link having a first end pivotally attached to the left transverse beam pivot point, to pivot about the first pivot axis, and a second end pivotally attached to the left platform pivot point, to pivot about the second pivot axis. The second link may have a first end pivotally attached to the right transverse beam of pivot point, to pivot about the first pivot axis, and a second end pivotally attached to the right platform pivot point to pivot about the second pivot axis. Smoother motion of the platform, between the carrying and loading positions, is achieved through articulation of the pair of links about the first and second pivot axes.

The platform may include at a forward end thereof, a deck support adapted to engage the front support assembly of the frame when the platform is in the carrying position for partially supporting the forward end of the platform. The platform may further include at an aft end thereof, a rear handle and ramp support, adapted to allow a user to grip the handle for moving the platform between the carrying and loading positions, and further adapted to receive and retain a upper end of a loading ramp.

The carrier/lift may include a loading ramp attachable in a first position to the platform for loading a small vehicle onto the platform, and attachable to the platform in a second position for stowage in a manner providing cargo space between the platform with the stowed ramps and the floor of the bed of a truck. In another form of my invention, an apparatus for carrying a small vehicle in the bed of a truck includes a platform, and a pair of nestable loading ramps, with the platform having a centrally located recess therein for receipt and storage of the nested loading ramps. The apparatus may further include a frame adapted for supporting the platform above the floor of the bed of the truck, to thereby provide storage space beneath the platform and stowed ramps. The platform and ramps may be configured such that, when the apparatus is utilized in a truck having a tailgate, the tailgate can be closed with the apparatus installed in the bed of the truck and the ramps stowed in the recess of the platform, to thereby provide an enclosed space for storage within the bed of the truck beneath the platform and stowed ramps. The platform and ramps may be configured such that when the apparatus is installed in the bed of the truck, the ramps can be secured to the platform. Each of the ramps may include longitudinally extending ribs joined on an upper surface thereof by threads, the ramps being nestable by inverting one ramps and placing the other ramp on top of the inverted ramp with the longitudinally extended ribs of the two ramps offset from one another. The ramps may be identical, with the treads having a tread width, and the longitudinal ribs having a rib width, and the nested pair having a total width equal to the tread width plus one rib width.

The platform may include a left and right deck plank joined on the underside thereof by crossbeams, with the left and right deck planks spaced apart by a gap of approximately the width of the nested ramps, with the crossbeams and gap forming the recess for receiving the nested ramps. Each ramp may be configured in a ladder-like fashion, having three longitudinal ribs, with one rib extending along each side of the ramps, and one rib extending along a longitudinal center line of the ramps. The ramps may include a hook at an upper end of the ramps for attaching the ramps to the platform, and a plurality of treads attached to the longitudinal ribs and spaced apart from one another.

These and other features, forms, and advantages of my invention will be apparent upon review of the following detailed description and attached drawing figures.

BRIEF DESCRIPTION OF THE DRAWINGS

FIG. 7 is an exploded perspective view of a frame assembly of the carrier/lift depicted in FIGS. 1–6;

FIG. 8 is an enlarged orthographic view showing the cross sectional shape of a longitudinal track of the carrier/lift depicted in FIGS. 1–7;

FIGS. 10a–c are orthographic projections depicting the platform and a pair of nestable ramps which are storable in the platform for the carrier/lift depicted in FIGS. 1–9.

DETAILED DESCRIPTION

Figure 1:
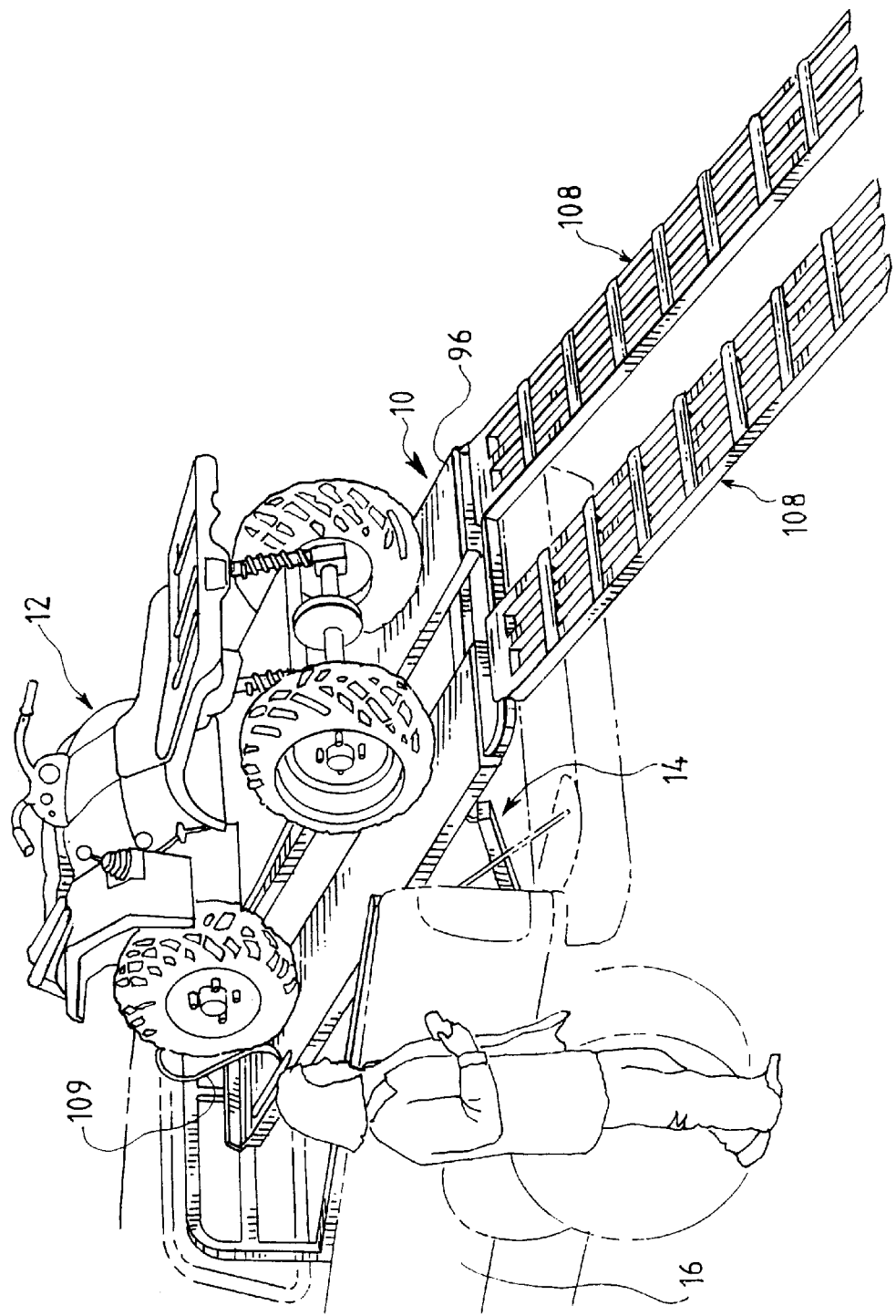
FIG. 1 is a perspective view of a carrier/lift mounted in the bed of a pick-up truck for transporting an All Terrain Vehicle (ATV)
Figure 2:
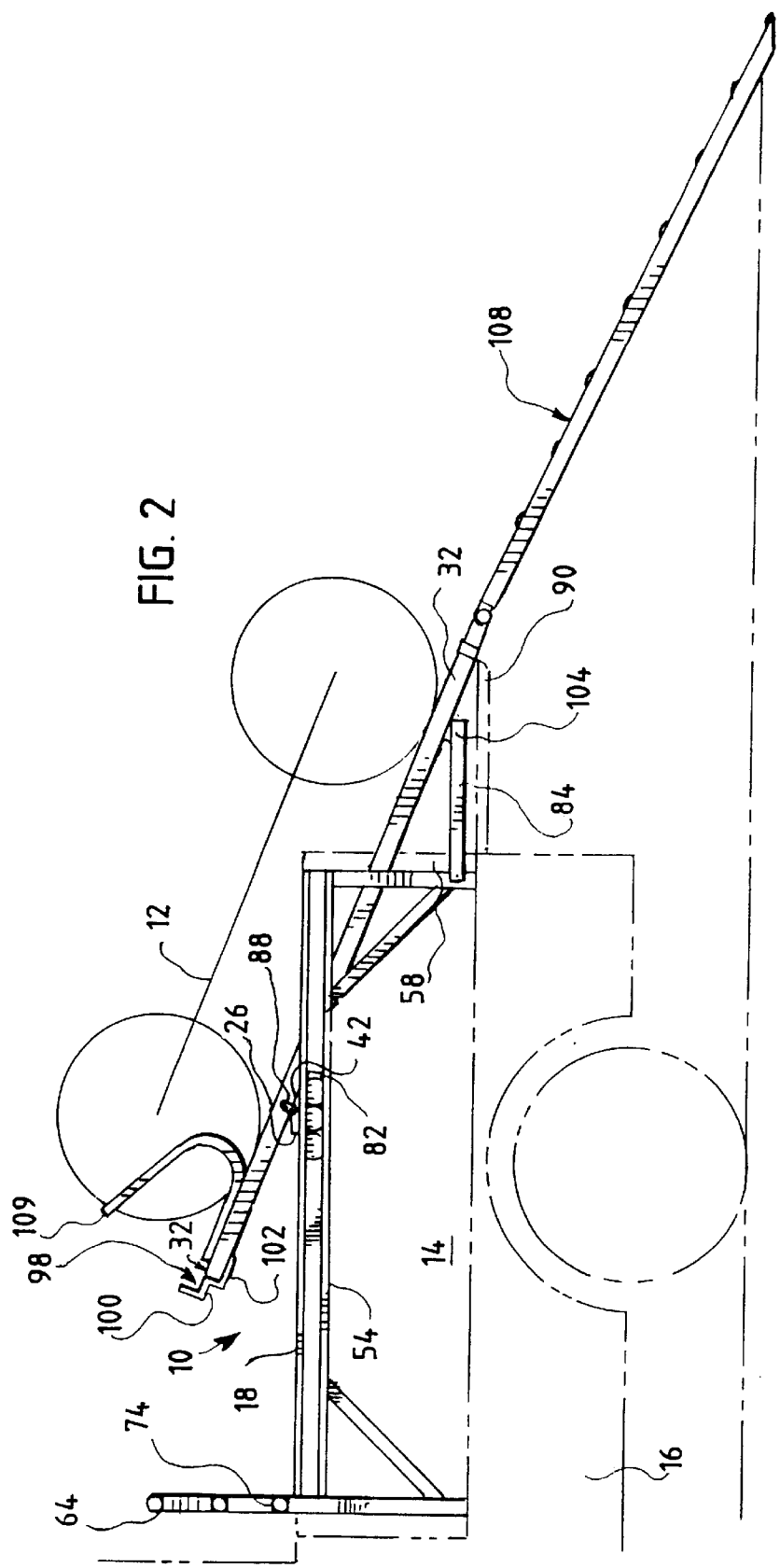
FIG. 2 is an orthographic depiction of the carrier/lift of FIG. 1 in a loading position.
Figure 3:
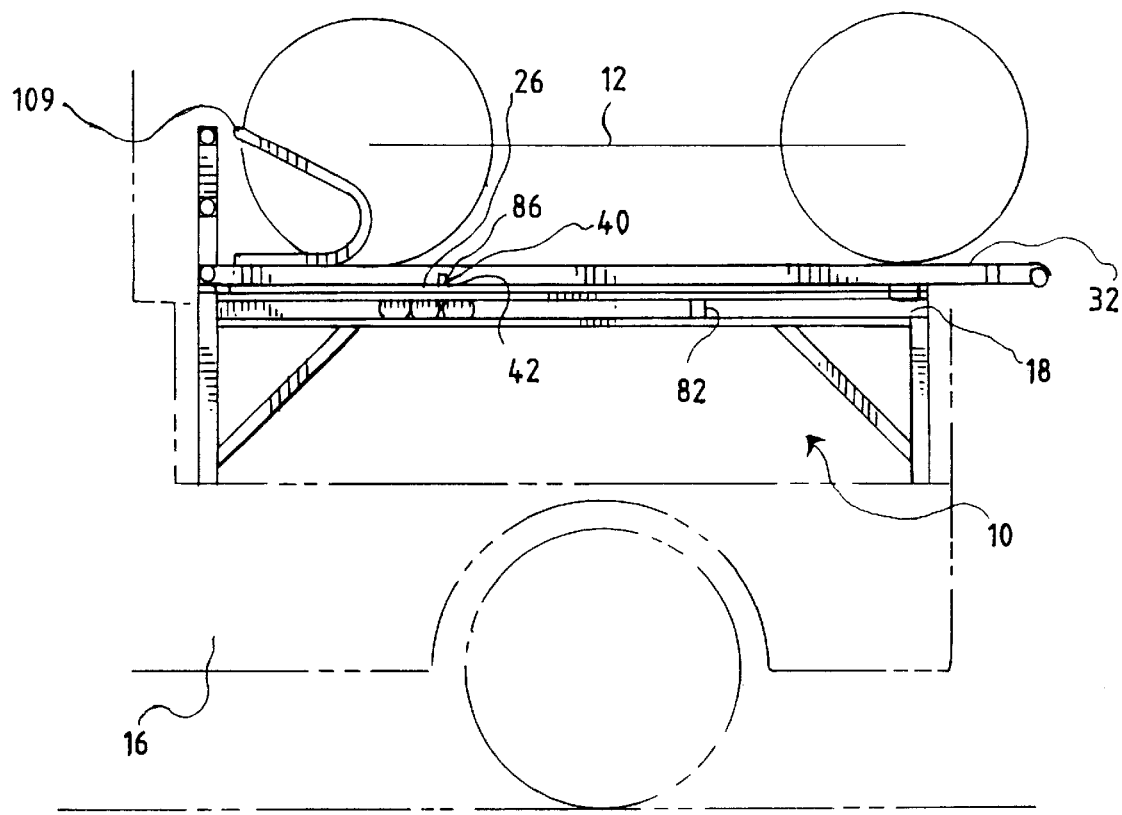
FIG. 3 is a orthographic depiction of the carrier/lift of FIG. 1 in a carrying position.
Figure 4:
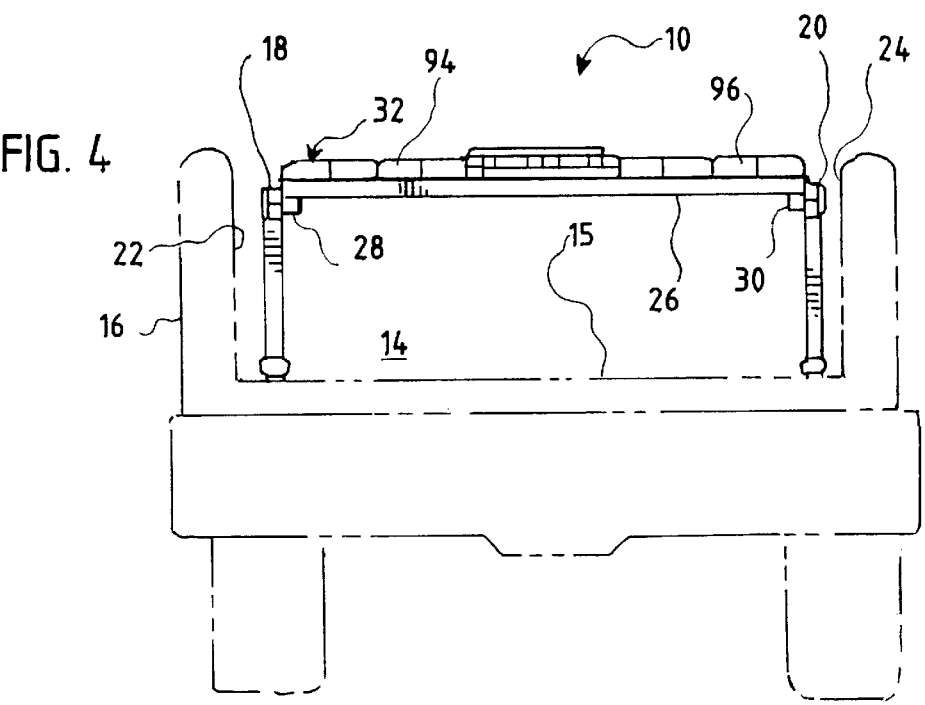
FIG. 4 is a rear view of the orthographic depiction of FIG. 3.

FIG. 1 shows a carrier/lift 10 for carrying a small vehicle 12 in the bed 14 of a truck 16. As shown in FIGS. 2, 3, and 4, the carrier/lift 10 includes a pair of longitudinal tracks 18, 20 adapted for mounting adjacent the left and right sides 22, 24 respectively of the bed 14 of the truck 16. A transverse beam 26 is adapted at the left and right ends thereof 28, 30 to engage the longitudinal tracks 18, 20 for translating movement of the transverse beam 26 along the tracks 18, 20 in a forward and aft direction with respect to the truck 16. A platform 32 is mounted on the transverse beam 26 for pivoting movement between a carrying position in which the platform 32 extends generally parallel to the longitudinal tracks 18, 20, as shown in FIGS. 3 and 4, and a loading position in which the platform 26 is inclined with respect to the longitudinal tracks 18, 20, as shown in FIG. 2.

The pivoting movement of the platform 32 on the transverse beam 26, in combination with the translating movement of the transverse beam 32 along the longitudinal tracks 18, 20 provides a pivoting and translating movement of the platform 32 that facilitates loading and carrying the small vehicle 12 in the bed 14 of the truck 16.

Figure 5:
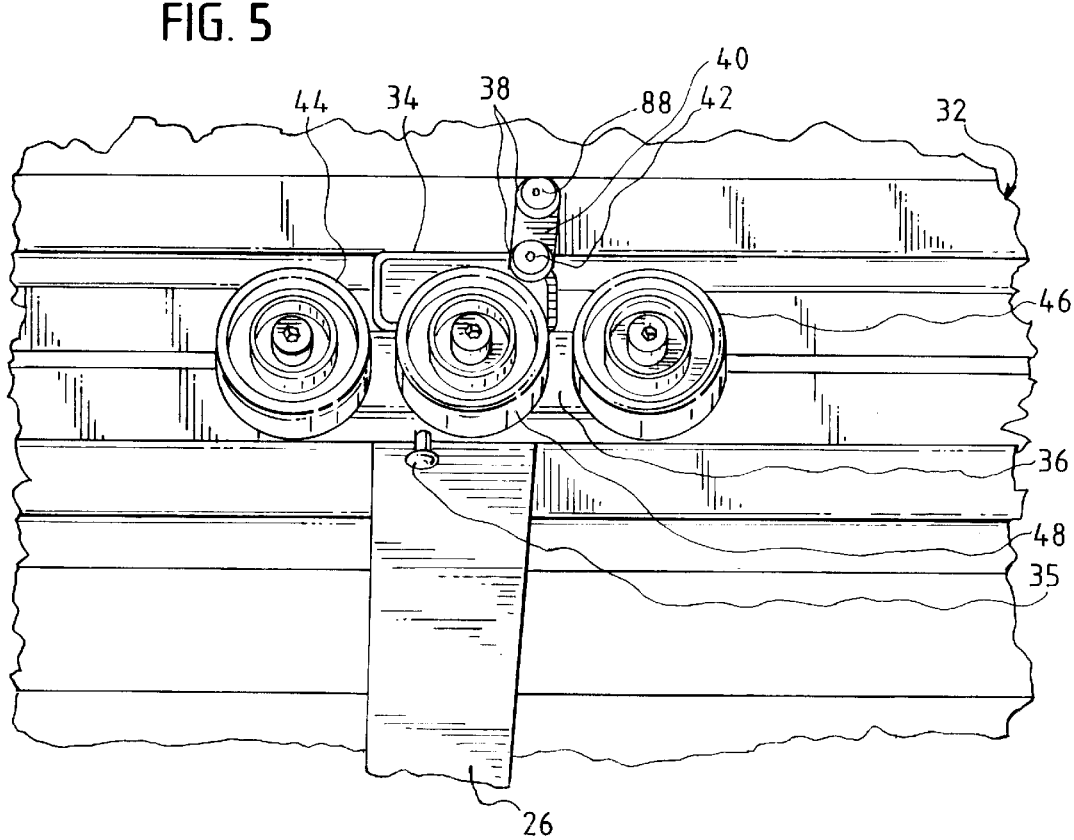
FIGS. 5 and 6 are perspective views of the left and right ends respectively of a transverse beam of the carrier/lift depicted in FIGS. 1–4.
Figure 6:
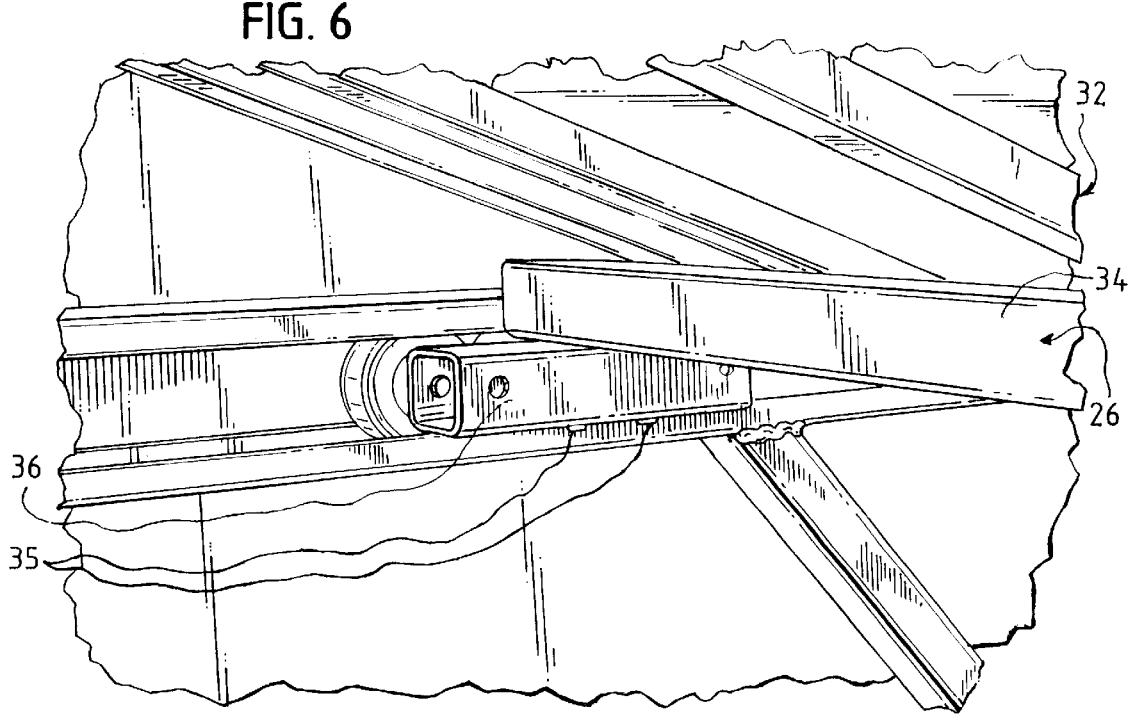
Figure 9:
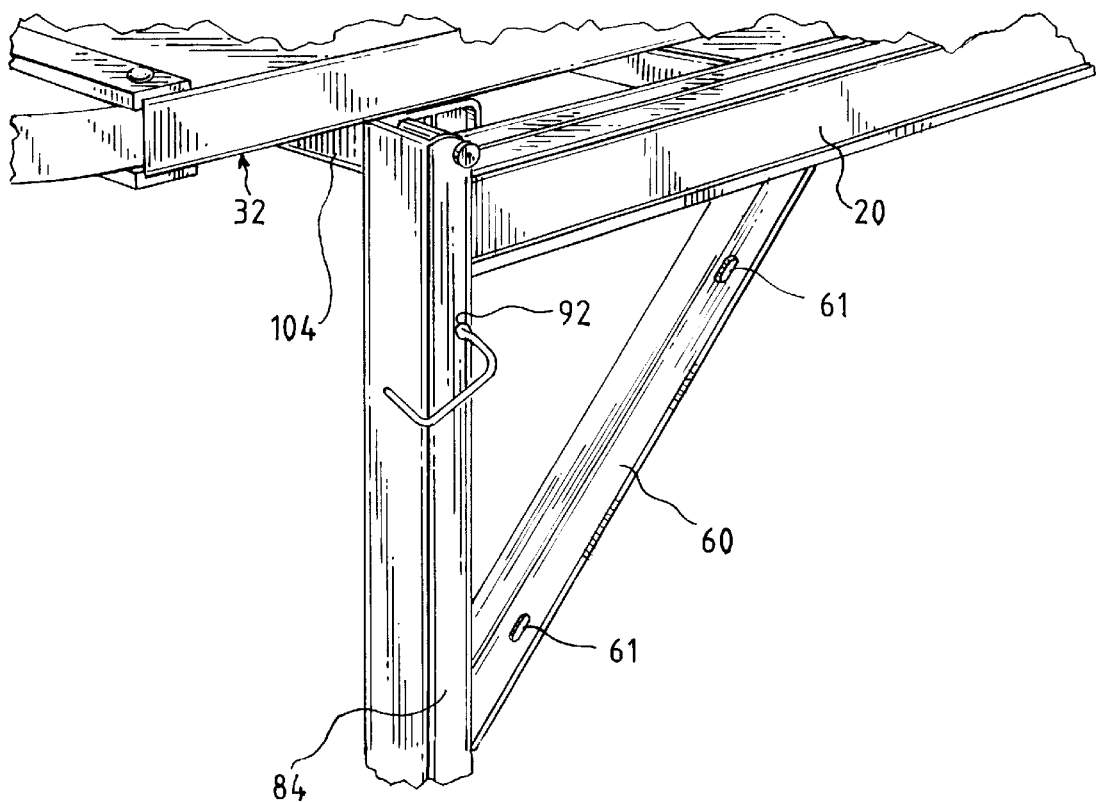
FIG. 9 is a perspective view of a locking pin installed through a swing arm and rear leg of the frame depicted in FIG. 7, to lock the platform of the carrier/lift of FIGS. 1–8 in the carrying position.

As shown in FIGS. 5 and 6, the transverse beam 26 in the exemplary embodiment includes a carrier 34, in the form of a rectangular tube, having a wide lower surface thereof attached at both ends 28, 30 by a pair of bolts 35 to a top surface of a carrier end 36, in the form of a square tube. The carrier ends 36 are oriented perpendicular to the carrier 34.

At both ends 28, 30 of the transverse beam 26, FIG. 4, the upper rear corners of the carrier tube 34 are tapped to receive a capscrew 38 for attachment of a lower end of a link 40. The centers of the tapped holes in the upper rear corners of the carrier 34 define a left and a right transverse beam pivot point, which in combination define a first pivot axis 42, the left end of which is indicated in FIG. 5. The platform 32 is pivotally attached to the transverse beam 26 along the first pivot axis 42 by the links 40, as described in more detail below.

The left and right ends 26, 28 of the transverse beam 26 each have three rollers 44, 46, 48 for engaging the left and right longitudinal tracks 18, 20 respectively. The carrier ends 36 of the transverse beam 26 extend forward and aft of the first pivot axis 42 and are adapted for mounting a first roller 44 on each end 28, 30 of the transverse beam 26 forward of the first pivot axis 42, and further adapted for mounting a second roller 46 aft of the first pivot axis 42. The carrier ends 34 have sufficient longitudinal length to allow the first and second rollers 44, 46 to be widely spaced from each other, and from the first pivot point 42, to provide smooth and straight tracking of the transverse beam 26 along the longitudinal tracks 18, 20.

In the exemplary embodiment, each carrier end 36 of the transverse beam 26 also includes a third roller 48 mounted between the first and second rollers 44, 46 to reduce the loading on the rollers 44, 46, 48 and promote long term, maintenance free operation of the carrier/lift 10. The rollers 44, 46, 48 are formed from a self-lubricating polyolefin material to promote smooth rolling translation of the rollers 44, 46, 48 in the tracks 18, 20. The rollers 44, 46, 48 are attached to the carrier ends 36 with shoulder bolts, which function as axles for the rollers, to minimize the number of parts required for mounting the rollers. As shown in FIGS. 7 and 8, the tracks 18, 20 are extruded 6061-T6 aluminum having a generally C-shaped cross section with a smooth internal surface finish to receive and constrain the rollers 44, 46, 48 in a manner that promotes smooth movement of the transverse beam 26 along the tracks 18, 20.

The carrier/lift 10 of the exemplary embodiment also includes a frame 50 adapted for supporting the longitudinal tracks 18,20 above the floor 15 of the bed 14 of the truck 16. As shown in FIG. 7, the frame 50 includes a left and a right rail assembly 52,54. The rail assemblies 52,54, are mirror images of one another. The left rail assembly 52 includes the left longitudinal rail 18, and a front and rear leg 56,58. The right rail assembly 54 includes the right longitudinal rail 20 and a front and a rear leg 56,58. The front and rear legs 56,58 on both the left and right tracks 18,20 respectively, and are adapted to support the tracks 18,20 above the floor 15 of the bed 14 of the truck 16. The left and right rail assemblies 52, 54 further include an angled brace 60 extending between each of the legs 56, 58 and the tracks 18,20, to provide additional stability and strengthening of the rail assemblies 52,54. The braces 60 are angle-iron shaped aluminum extrusions in the exemplary embodiment, having slotted holes 61 adapted to receive hooks on the end of web tie-down straps (not shown) which are used to attach the carrier/lift 10 to tie-down hooks (not shown) in the four corners of the bed 14.

The front and rear legs 56,58 of the exemplary embodiment are extruded aluminum tubes having a square cross-section. The front legs 56 are longer than the rear legs 58, and extend vertically past the tracks 18,20 to provide an open end of the tubular front legs 56, for receipt of front support assembly splices 62. The rear legs 58 are joined to the underside of the tracks 18,20 in the rail assemblies 52, 54, so that aft ends of the tracks 18,20 remain open for receipt of the rollers 44, 46, 48 of the transverse beam 26.

The frame 50 further includes a front support assembly 64 adapted for joining the forward ends of the left and right rail assemblies 52, 54. The front support assembly 64 includes a U-shaped main support bar 66 of square tubular cross-section, having a straight horizontal top bar 68 joined by smooth corner radii to a left and right vertical leg 70, 72. The lower ends of the vertical legs 70, 72 are open for receipt of the upper ends of the front support assembly splices 62.

The front support assembly 64 further includes a front platform support bar 74, extending horizontally between the vertical legs 70, 72 at a lower end of the vertical legs 70, 72, and an intermediate support bar 76, extending horizontally between the vertical legs 70, 72 at a point on the vertical legs 70, 72 between the top bar 68 and the front platform support bar 74. The front platform support 74 and the intermediate support bar 76 each have a square tubular cross-section. A pair of short vertical bars 78 are joined between the top bar 68 and the intermediate support bar 76. The short vertical bars 78 are spaced from one another on opposite sides of a vertical center line of the front support assembly, and include holes for receipt of a winch hook attachment bar 80.

The front support assembly 64 is connected to the left and right rail assemblies 52,54 by inserting the lower ends of the front support assembly splices 62 into the openings in the tipper ends of the front legs 56 of the rail assemblies 52,54, and inserting the upper ends of the splices 62 into the openings in the lower ends of the left and right vertical legs 70, 72 of the front support assembly 64. The splices 62 are secured with bolts (not shown) passing through the front legs 56 of the rail assemblies 52,54 and the vertical legs 70, 72 of the front support assembly. The splices 62 are long enough to extend above the intermediate support bar 76 and downward through much of the front legs 56, to thereby provide a double-walled construction for reinforcing the juncture of the rails 52,54 and the front support assembly 64. The splices 62 also provide significant additional stiffening of the front support assembly 64 against bending forces exerted when a winch attached to the winch hook attachment bar 80 is used in loading a vehicle onto the platform 32 of the carrier/lift 10.

The frame 50 further includes a rear spacer bar 82 adapted for joining the aft ends of the left and right rail assemblies 52, 54. The rear spacer bar 82 in the exemplary embodiment is a rectangular shaped tube adapted to be attached by bolts (not shown) to the left and right longitudinal tracks 18, 20 after the transverse beam 26 is installed into the tracks 18, 20. The rear spacer bar 82 is positioned in the tracks 18, 20 to also function as a stop, for limiting aftward travel of the transverse beam 26 in the tracks 18, 20, as illustrated in FIGS. 2 and 3.

As shown in FIGS. 2 and 7, the exemplary embodiment of the carrier/lift 10 also includes a left and a right swing arm 84, 86 for guiding the movement of platform 32 between the loading and carrying positions, and for partially supporting the platform 32 while it is being moved from the loading to the carrying position, to thereby significantly reduce the amount of lifting force required for moving the platform 32 from the loading to the carrying positions with a vehicle 12 on the platform. The left swing arm 84 is pivotally attached at a lower end of the left swing arm 84 to the lower end of the rear leg 58 of the left rail assembly 52, and pivotally attached at an upper end of the left swing arm 84 to the platform 32 at a point aft of the first pivot axis 42. Similarly, the right swing arm 86 is pivotally attached at a lower end of the right swing arm 86 to the lower end of the rear leg 58 of the right rail assembly 54, and pivotally attached at an upper end of the right swing arm 86 to the platform 32 at a point aft of the first pivot axis 42.

To provide smoother motion of the platform 32 between the loading and carrying positions, a pair of links 40 are utilized for pivotally attaching the platform 32 to the transverse beam 26, as shown in FIGS. 2, 3, and 5. The platform 32 includes a left and right pivot point which together define a second pivot axis 88, one end of which is illustrated in FIGS. 2, 3, and 5. The upper ends of the links 40 are pivotally attached to the platform 32 by capscrews 38 centered on the second pivot axis 88, so that the links 40 can pivot about both the first and second pivot axes 42, 88. By mounting the platform 32 in this manner, all of the pivoting joints of the carrier/lift 10 can be closely fitting, to avoid slop in the joints and provide smooth operation of the carrier/lift 10 without fear that the pivoting joints will bind against one another. In a preferred embodiment, the first and second pivot axes 38, 88 are offset vertically from one another when the platform 32 is in the carrying position, so that the transverse beam 26 can move to a location relative the platform 32 in the carrying position where the bottom of the platform 32 will rest directly on the carrier 34 of the transverse beam 26. With the platform 32 resting on the carrier 34, the weight of the platform 32 and a vehicle 12 on the platform is transferred directly to the carrier 34 without having to be supported by the pivot joints at the ends of the links 40, thus promoting long, maintenance free life of the carrier/lift 10.

The swing arms 84, 86 in the exemplary embodiment are configured as U-shaped extrusions which wrap around the rear legs 58 and extend generally perpendicular to the longitudinal tracks 18, 20 of the rail assemblies 52, 54 when the platform is in the carrying position, as shown in FIG. 3, and are further configured to extend generally parallel to the longitudinal tracks 18, 20 when the platform 32 is in the loading position, as shown in FIG. 2. As also shown in FIG. 2, the swing arms 84, 86 are configured in a preferred embodiment to rest on the bed 14 or the tailgate 90 of the truck 16, when the platform 32 is in the loading position, to support the aft end of the platform 32 and limit the incline of the platform 32.

Each of the U-shaped swing arms 84, 86 and rear legs 58 include aligned holes for receipt of a locking pin 92, for locking the swing arms 84, 86 to the rear legs 58 when the platform 32 is in the carrying position. With the locking pins 92 inserted, the swing arms 84, 86 are locked to the rear legs 58, and the mechanical linkages of the carrier/lift 10 described above prevent the platform 32 from moving out of the carrying position.

As shown in FIGS. 2, 4, and 10a, the platform 32 of the exemplary embodiment includes a left and a right deck plank 94, 96, joined at a forward end of the platform 32 by a front deck support 98 having a lip 100 extending forward from the platform 32 for engaging and resting on the top surface of the front platform support bar 74 of the front support assembly 64 when the platform 32 is in the carrying position, for partially supporting the forward end of the platform 32. The front deck support 98 further includes a second lip 102 extending under and attached to the forward end of the left and right deck planks 94, 96 which functions as a forward cross beam of the platform. The platform 32 further includes an aft cross beam 104 joining the left and right deck planks, and also having a tapped hole at both ends for receipt of a shouldered bolt for pivotally connecting the upper ends of the swing arms 84, 86 to the platform.

The aft end of the platform 32 includes a U-shaped rear handle and ramp support 106, formed from square aluminum tubing. The handle and ramp support 106 allows a user to grip the handle for moving the platform 32 between the carrying and loading positions, and also provides a means for receiving and retaining the upper end of a loading ramp.

The carrier/lift 10 of the exemplary embodiment includes a pair of nestable loading ramps 108, which can be stowed when nested in a centrally located recess 110 of the platform 32, as shown in FIGS. 4 and 10a–c. The ramps 108 are configured in a ladder-like fashion with three longitudinal ribs 112, having a rectangular tubular cross section, joined at an upper end of each ramp 108 by a hook 114, for attaching the ramp 108 to the rear handle and ramp support 106 of the platform 32, and further joined by a plurality of treads 116 attached to the longitudinal ribs 112 and spaced apart from one another. One of the longitudinal ribs 112 extends along either side of the ramp 108, and the third rib 112 extends along a longitudinal centerline of the ramp 108. The ramps 108 are thus identical with one another and symmetrical about the longitudinal centerline of the ramps 108.

When one of the ramps 108 is inverted and the second ramp 108 is placed on top of the inverted ramp 108 with the longitudinal ribs 108 of the ramps 108 offset from one another, and with the sides of the ribs 112 of the first and second ramp 108 contacting each other, the nested pair will have a total width equal to the tread width plus one rib width. The left and right deck planks 94, 96 of the platform are spaced apart from one another by a gap of approximately the width of the nested pair of ramps 108, with the gap between the deck planks 94, 96, in combination with the top surfaces of the aft platform cross beam 104, the forward platform cross beam 104 portion of the front deck support 98, and the top surface of the carrier 34 of the transverse beam 26 forming the recess 110 for stowage of the nested ramps 108 within the platform 108.

To stow the ramps 108 in the recess 110, one of the ramps 108 is inverted and placed in the recess 110 with the ribs 112 of the ramp facing up, and its hook 114 at the forward end of the platform 32. The second ramp 108 is then nested into the inverted ramp 108 with its hook 114 hooked over the rear handle and ramp support 106 at the aft end of the platform.

Having the ramps 108 and platform 32 configured as described above provides a number of advantages. The ladder-like construction of the ramps 108 is very strong, and yet light in weight for ease of handling. The ladder-like ramps can be easily gripped anywhere along their length, by grasping either the ribs 110 or the treads 116. The spaced treads 116 allow dirt or mud on the wheels of a vehicle being loaded to fall to the ground between the treads 116, rather than becoming packed and perhaps slippery as might be the case on a ramp having an imperforate upper surface. Stowing the nested ramps 108 within the recess 110 of the platform 32 also provides a usable storage space in the bed 14 of the truck 16, beneath the platform and stowed ramps. This provides a big advantage over prior carrying devices in which loading ramps were stowed on the floor 15 of the bed 14, therby preventing the bed 14 from being used for carrying other cargo.

With the nested ramps 108 stowed in the recess 110, the ramps 108, and a vehicle 12 being carried on the platform 32 can readily be locked to the carrier/lift 10 using commercially available locking cables passed through the openings in the ramps 108 and around one or more parts of platform 32, the transverse beam 26, and the frame 50. Where truck 16 has a tailgate that can be closed with the platform 32 in the carrying position, a totally enclosed space is available within the bed 14 beneath the platform 32 and stowed ramps 108.

As shown in FIGS. 1–3 and 10a, one or more wheel chocks 109 may be attached to the platform 32 for positioning and securing a vehicle 12 in the carrying position. The chocks illustrated in the drawings are commercially available chocks constructed from formed and plated tubular steel. Other forms of chocks can also be used to equal advantage.

To load a vehicle 12 into the bed 14 of the truck 16, the tailgate 90 is lowered, and the ramps are removed from the recess 110 and set aside for the moment. The locking pins 92 are removed, and by pulling on the rear handle 106, the platform 32 is translated and pivoted into the loading position. The upper ends of the ramps 108 are then attached to the rear handle and ramp support 106 using the hooks 114. The vehicle 12 is positioned at the lower end of the ramps 108.

If the vehicle is equipped with a winch, the winch cable is attached to the winch hook attachment bar 80, and the winch is used to pull the vehicle 12 up the ramps 108 and onto the platform 32. Alternatively, the vehicle 12 could be driven or pushed up the ramps 108 and onto the platform, but the use of a winch is highly preferred for safety, because even a small ATV can weigh 450 to 800 pounds.

The vehicle 12 is secured to the platform 32, and the platform 32 is moved to the carrying position. The ramps 108 can be left hooked to the rear handle 106 while the platform is being moved, but preferably they are removed and set aside while the platform 32 is being moved to the carrying position. The locking pins 92 are inserted through the swing arms 84, 86 and rear legs 58 to lock the platform 32 in the carrying position, and the ramps 108 are re-stowed in the recess 110 of the platform 32.

The amount of lifting effort required to move the platform 32 from the loading position to the carrying position will vary with the weight and shape of the vehicle 12, whether or not a winch is used, and the configuration of the component parts of the carrier/lift 10. By changing various aspects of the component parts of the carrier/lift, for example by moving the location of the second pivot axis 88 forward or aft on the platform 32, the amount of lifting force that one must exert on the rear handle 106 to move the platform from the loading position to the lifting position can be changed significantly. Where a winch will be used for loading and unloading the vehicle, the winch will aid in moving the platform 32, and the carrier/lift 10 is preferably constructed to require a lifting force of about 120 pounds with a 450 to 800 pound vehicle on the platform. Such a configuration will provide a smooth, slow movement of the platform from the loading to the carrying position, so that the front deck support 98 of the platform 32 will gently come to rest on the front platform support bar 74 as the platform reaches the carrying position. If the platform 32 will be lifted manually, without a winch, however, or where the vehicle to be loaded and carried is not heavy, it might be advantageous to adjust the design of the carrier/lift to require a lower lifting force.

Although I have described my invention with reference to certain exemplary embodiments disclosed above and in the accompanying drawings, those having skill in the art will recognize that many other embodiments are also possible within the scope of the appended claims. For example, the structures described above are largely fabricated from aluminum extrusions in a manner resulting in a lightweight structure, having a total weight of about 150 pounds, to facilitate installation of the carrier/lift into the bed of the truck. The embodiments described above also were configured to be readily constructed in a manner resulting in a carrier/lift that, once assembled, can be left assembled and stored on a garage floor, for instance, but yet be capable of being conveniently shipped in a flat, knocked-down condition. There are many other materials and configurations that meet these constraints within my contemplation and the scope of the appended claims, and even more possibilities meeting only some or none of the constraints imposed on the design of the exemplary embodiments.

I also wish to expressly state that although I have shown a pick-up truck in the accompanying illustrations, and utilized directional terms, such as forward, aft, left, right, upper and lower, with reference to the pick-up trucks in the illustrations, I fully contemplate that my invention can and will be used with other types of trucks, trailers, boats, etc., instead of a pick-up truck. I used the directional terms solely to facilitate understanding of the exemplary embodiments described herein and depicted in the accompanying illustrations. It is certainly within my contemplation and the scope of the appended claims that an apparatus according to my invention could be mounted in a transverse direction on the bed of a truck or other vehicle, and that in such instance those skilled in the art would readily recognize that it would still be my invention that was being used.

The scope of my invention is not limited to the specific embodiments described above, and is limited only by the scope of the appended claims.

I claim:

1. A carrier/lift for loading and carrying a small vehicle in the bed of a truck, the carrier/lift comprising:
   a pair of longitudinal tracks adapted for mounting one track adjacent each side of the bed of the truck;
   a transverse beam having ends engaging the longitudinal tracks for translating movement of the transverse beam along the tracks between a forward carrying position and a rearward loading position; and
   a platform mounted on and carried by the transverse beam at a midpoint of the platform for pivoting movement about a pivot axis of said transverse beam between the carrying position in which the platform extends generally parallel to the longitudinal tracks, and the loading position in which the platform is inclined with respect to the longitudinal tracks;
   the pivoting movement of the platform about the pivot axis of the transverse beam in combination with the translating movement of the transverse beam along the longitudinal tracks providing a pivoting and translating motion of the platform that facilitates loading, carrying and unloading the small vehicle in the bed of the truck.

2. The carrier/lift of claim 1 wherein the bed includes a floor and further comprising a frame below the longitudinal tracks which supports the longitudinal tracks spaced above the floor of the bed.

3. A The carrier/lift of claim 2 wherein the frame comprises:
   left and right rail assemblies, each including one of the pair of longitudinal tracks and a front and rear leg extending downward from the longitudinal track, the legs being adapted to support the longitudinal track above the floor of the bed;
   a front support assembly adapted for joining the left and right rail assemblies at a forward end thereof; and
   a rear spacer bar adapted for joining the left and right rail assemblies at an aft end thereof.

4. The carrier/lift of claim 3 wherein the front support assembly includes a winch mount.

5. The carrier/lift of claim 2 further including a left and a right swing arm for guiding movement of the platform between the loading and carrying positions and partially supporting the platform while guiding the movement thereof, the left swing arm being pivotally attached at one end thereof to a left rear leg of the frame at a lower end of the left rear leg and pivotally attached at the other end thereof to the platform at a point aft of the pivot axis, and the right swine arm being pivotally attached at one end thereof to a right rear leg of the frame at a lower end of the right rear leg and pivotally attached at the other end thereof to the platform at a point aft of the pivot axis.

6. The carrier/lift of claim 5 wherein the swing arms are configured to extend generally perpendicular to the longitudinal tracks when the platform is in the carrying position, and are further configured to extend generally parallel to the longitudinal tracks when the platform is in the loading position.

7. The carrier/lift of claim 6 wherein the swing arms are adapted to rest on the floor of the bed when the platform is in the loading position.

8. The carrier/lift of claim 6 further including a lock for securing the platform in the carrying position.

9. The carrier/lift of claim 8 wherein the lock secures the swing arms to the rear legs for preventing movement of the platform away from the carrying position.

10. The carrier/lift of claim 2 wherein the frame includes a front track support assembly and the platform includes at a forward end thereof a front deck support which engages the front track support assembly when the platform is in the carrying position for partially supporting the forward end of the platform.

11. The carrier/lift of claim 2 further including a loading ramp attachable in a first position to the platform for loading a small vehicle onto the platform and attachable to the platform in a second position for stowage in a manner providing cargo space between the platform with stowed ramp and the bed of the truck.

12. The carrier/lift of claim 11 wherein the ramp is configured in ladder-like fashion comprising:
   three longitudinal ribs, with one rib extending along either side of the ramp and one rib extending along a longitudinal centerline of the ramp;
   a hook at an upper end of the ramp for attaching the ramps to the platform; and a plurality of treads attached to the longitudinal ribs and spaced apart from one another.

13. The carrier/lift of claim 1 wherein the transverse beam includes a roller at each end thereof adapted to engage one of the pair of longitudinal tracks, and each of the tracks is adapted to receive the roller and constrain the roller for translating rolling movement of the roller along the track.

14. The carrier/lift of claim 1 wherein the transverse beam includes two rollers at each end thereof for engaging one of the pair of longitudinal tracks, one of the two rollers at each end being mounted to the transverse beam forward of the pivot axis and the other roller being mounted to the transverse beam aft of the pivot axis.

15. The carrier/lift of claim 1 wherein the tracks have a generally C-shaped cross section configured to receive and constrain rollers on the ends of the transverse beam.

16. The carrier/lift of claim 15 wherein the tracks are open at an aft end thereof for receipt of the rollers.

17. The carrier/lift of claim 16 wherein said rear spacer bar is adapted for attachment to the tracks after installation of the rollers into the tracks and at a position along the tracks for limiting aftward translation of the transverse beam.

18. The carrier/lift of claim 1 wherein:

the transverse beam includes a right and a left transverse beam pivot point defining said pivot axis;

the platform includes a right and left platform pivot point defining a second pivot axis; and the carrier/lift further includes a pair of links for attaching the platform to the transverse beam, one link having a first end pivotally attached to the left transverse beam pivot point to pivot about said pivot axis and a second end pivotally attached to the left platform pivot point to pivot about the second pivot axis, and the second link having a first end pivotally attached to the right transverse beam pivot point to pivot about said pivot axis and a second end pivotally attached to the right platform pivot point to pivot about the second pivot axis;

to thereby provide smooth motion of the platform between the carrying and loading positions through articulation of the pair of links about the first and second pivot axes.

19. The carrier/lift of claim 1 wherein the platform further includes at an aft end thereof a rear handle and ramp support adapted to allow a user to grip the handle for moving the platform between the carrying and loading positions, and further adapted to receive and retain an upper end of a loading ramp.

* * * * *